Feb. 11, 1930.  W. H. ELSEY  1,746,245
PRICE INDICATOR
Filed Oct. 7, 1927   2 Sheets-Sheet 1
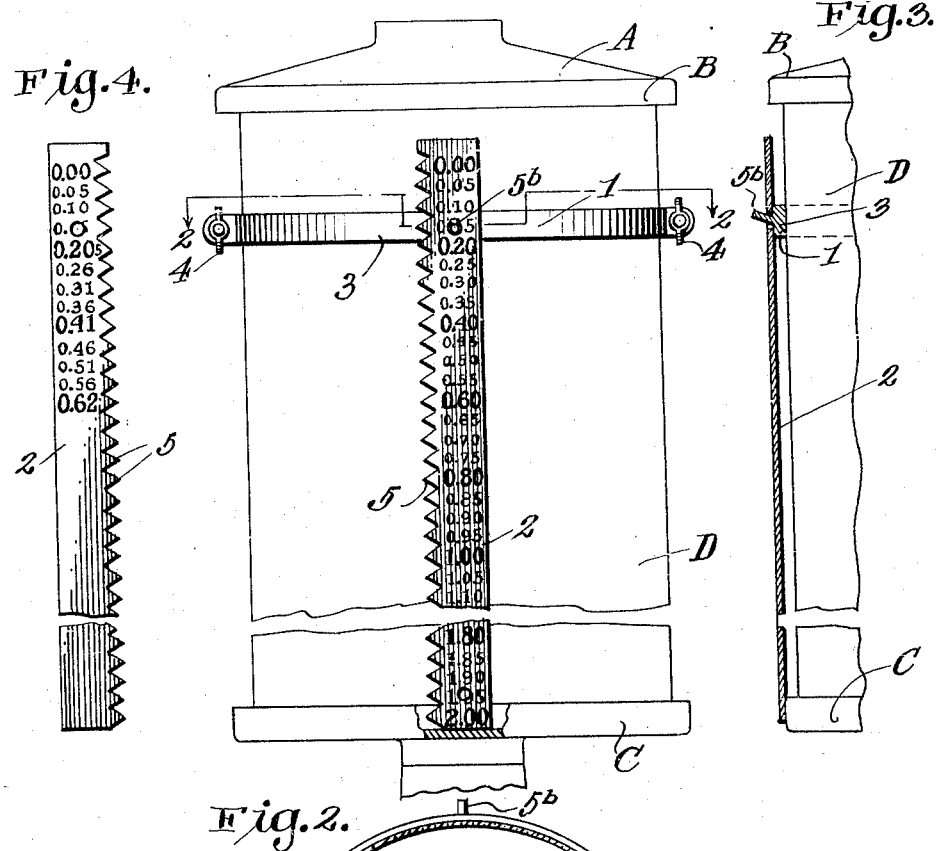
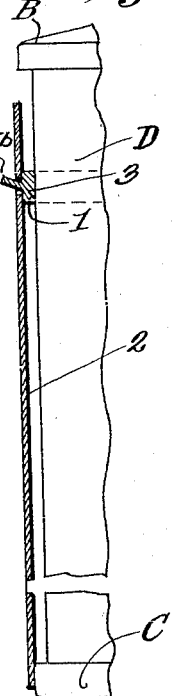
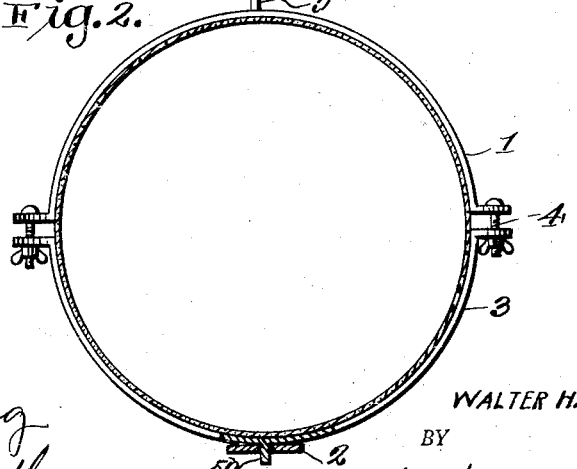
INVENTOR.
WALTER H. ELSEY
BY
ATTORNEYS.

Feb. 11, 1930. W. H. ELSEY 1,746,245
PRICE INDICATOR
Filed Oct. 7, 1927  2 Sheets-Sheet 2
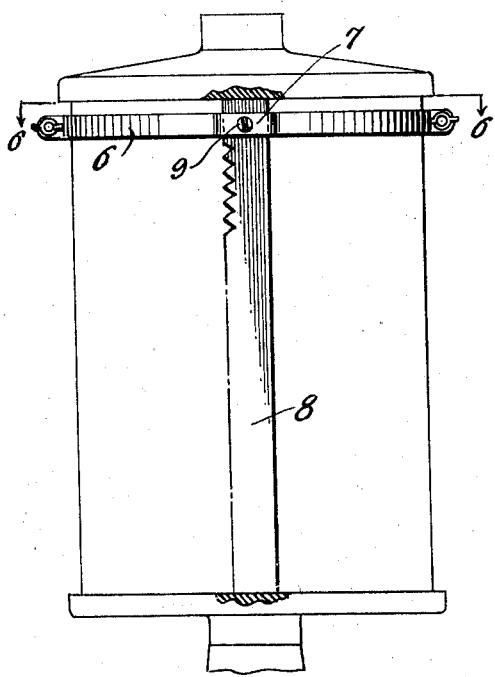
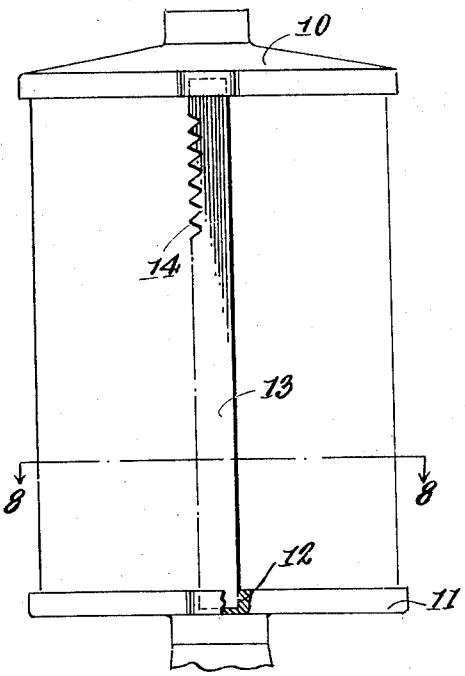
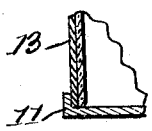
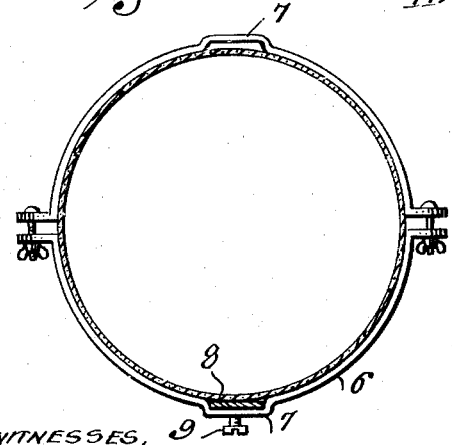
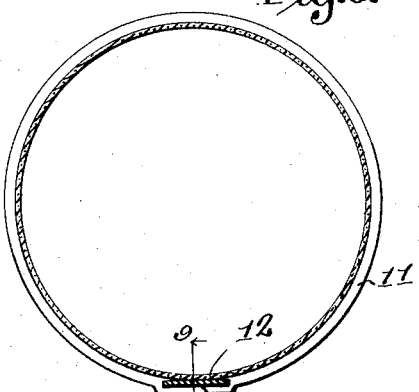
INVENTOR.
WALTER H. ELSEY
BY
ATTORNEYS.

Patented Feb. 11, 1930

1,746,245

UNITED STATES PATENT OFFICE

WALTER H. ELSEY, OF MARBLE, ARKANSAS, ASSIGNOR TO OSAGE PRICE INDICATOR COMPANY, OF FAYETTEVILLE, ARKANSAS

PRICE INDICATOR

Application filed October 7, 1927. Serial No. 224,665.

This invention relates to a price indicator and has for its primary object the construction of an indicator that may be effectively secured to gasoline pumps now in use to function with the rise and fall of the level of the gasoline to indicate the price of a quantity of gasoline discharged from the pump.

An object of the invention is the construction of an indicating attachment for pumps including a plurality of price strips having different scales of prices thereon so that a particular strip may be selected according to the scale of prices for a particular day to be supported contiguous to the visible quantity of gasoline to function with the rise and fall of the latter to indicate the price of a quantity of gasoline discharged from the pump.

Another object of the invention is the design of a price indicator that may be economically manufactured and very readily attached to the glass container of the pump and when once attached capable of supporting in the proper display position strips having different scales of prices thereon to accommodate changes in prices of gasoline.

A feature of the invention is the novel manner of positioning the price strip so as to not only properly function with the rise and fall of the level of the gasoline, but to effectively engage structural features of the pump to assure the proper positioning of the strip according to the uppermost level of the gasoline.

With these and other objects in view, the invention will be better understood from the following detailed description taken in connection with the accompanying drawings, wherein:

Figure 1 is a fragmentary view of a gasoline pump showing my price indicator attached thereto, Figure 2 is a sectional view on the line 2—2 of Figure 1, Figure 3 is a vertical sectional view, Figure 4 is a rear elevation of the strip shown in Figure 1, Figure 5 is a side elevation of another form of indicator, Figure 6 is a sectional view on the line 6—6 of Figure 5, Figure 7 is a side elevation of a third form of indicator, Figure 8 is a sectional view on the line 8—8 of Figure 7, and Figure 9 is a detailed sectional view of that form of invention shown in Figure 7.

Again referring to the drawings illustrating three of the many constructions of my invention and more particularly to Figures 1 to 4 inclusive, the letter A designates an ordinary container structure of a gasoline pump, indicating the upper support or plate B, the lower support or plate C and the glass container D.

My invention resides in the novel construction of price indicator that may be effectively secured to the container D to function with the rise and fall of the gasoline in the container D to indicate the price of a quantity of gasoline discharged from the pump. The indicator consists primarily of two major parts, a support 1 secured to the container and a price indicating strip 2 detachably connected to the support. At this time I wish to call attention to the fact that a plurality of price strips will be used with the support so that a particular price may be selected according to the prevailing price of the gasoline, thereby enabling the attachment to properly take care of the fluctuation in prices of gasoline.

In Figures 1 to 4 inclusive, I have shown a support in the form of a pair of band sections 3 effectively secured around the container by means of thumb screws 4 that are mounted in the ends of the sections and when adjusted will draw the ends together thereby effectively bringing the sections into binding engagement with the container D. Each section is provided with a pin or stud 3 preferably inclined slightly upwardly so as to effectively receive and support the price strip as clearly shown in Figure 3.

Each price strip has a scale of prices on its front and rear surfaces of a different arrangement so as to enable a single strip to display two scales of prices. To facilitate the alignment of the prices of the scale with relation to the level of the gasoline, each strip has one edge serrated to provide a plurality of points 5 projecting horizontally so as to properly function with the level of the gasoline in the container.

In that construction of my invention just described, the price strips are suspended parallel to the container but it may be found advisable in practice to provide a more rigid connection between the price strips and the support and a closer relation between the price strips and the wall of the container and to accomplish this desired result. I have shown in Figures 5 and 6 each section 6 of the support provided with a recess 7 to accommodate therein the upper end of the price strip 8. You will note in this particular construction of my invention that the price strip is of a length to have its ends arranged in abutting relation with the upper and lower support plates of the container, thereby assuring the proper positioning of the price strip according to the uppermost level of the gasoline arranged in the container. Thus, it will be appreciated that accuracy of the indication is assured thereby positively preventing fraud. To bring about a more effective engagement between the strip 8 and the support I have shown a set screw 9 mounted in the section and binding against the price strip.

The forms of my invention heretofore described are constructed to be detachably applied to pump structures now in use thereby necessitating the use of suitable forms of clamps or supports but in the manufacture of the pump structure, the latter may be designed to be effectively engaged by the price strip and to accomplish this desired result, I have shown in Figures 7, 8 and 9 the pump structure designed to have a detachable engagement with the ends of the price strip. The upper support plate 10 and the lower support plate 11 are designed to be provided with recesses 12 for receiving the ends of the price strip 13 also provided with indicating points 14. In this construction of my invention the strip can be effectively arranged in place by slightly flexing the latter to allow the ends to spring into the recesses 12, relieving the strips of a flexing action allows the same to regain its normal position which corresponds to a flat engagement with the wall of the cylinder, and thus the strip is effectively held in flat engagement with the wall of the cylinder without the use of extra attachments.

It will now be appreciated that I have designed a price indicator that may be quickly and effectively attached to gasoline glass containers to function with the rise and fall of the level of the gasoline in the container to indicate accurately the price of any quantity of gasoline removed from the container. I am aware of the fact that the scales have been used with pump structures now in use to indicate the quantity in gallons of gasoline removed from the container, but I am of the opinion that I am the first to provide an indicator strip so arranged contiguous to the gasoline container that immediate visible indications can be given as to the price of any quantity of gasoline removed from the container. It will also be appreciated that due to the vertical positioning of the strip and the vertical arrangement of the scale of prices, lowering of the level of the gasoline will give immediate indication as to the price of the quantity of gasoline removed, due to the fact that the level of the gasoline at all times will correspond to a particular price on the indicator strip.

In concluding, I wish to call particular attention to the fact that the success of the invention is depending upon the use of a plurality of price strips having differently arranged thereon scales of prices so as to take care of fluctuation in the price of gasoline. Therefore, it is necessary that a suitable connection be provided between the price strip and the support to enable a strip to be readily substituted for a strip formerly displayed.

It is, of course, to be understood that various other types of supports may be utilized and the strips may be supported in various other manners than illustrated therefore, I do not desire to be limited in protection in any manner, whatsoever, except as set forth in the following claim.

What I claim is:

A price indicator attachment for gasoline tanks comprising a split band for disposal about the tank, means for closing the band to cause the same to bind the tank at a desired elevation, a stud extending from the band at an upward angle of inclination, and a strip provided with an opening near its upper end adapting the strip to be suspended from said stud in vertical position beside the tank, the said strip bearing a vertical column of price indicia.

In testimony whereof I affix my signature.

WALTER H. ELSEY.